__United States Patent Office__
3,076,786
Patented Feb. 5, 1963

3,076,786
COPOLYMERS OF FORMALDEHYDE AND VINYL ETHERS
Northrop Brown and Edward Terry Cline, Wilmington, and Timothy Edmond O'Connor, Brandywine Hundred, Del., assignors to E. I. du Pont de Nemours and Company, Wilmington, Del., a corporation of Delaware
No Drawing. Filed June 13, 1960, Ser. No. 35,419
11 Claims. (Cl. 260—73)

This invention relates to novel and useful compositions of matter and to their preparation, and, more particularly, it relates to copolymers of formaldehyde and vinyl ethers.

In U.S. Patent 2,768,994 issued October 30, 1956, to R. N. MacDonald there is described and claimed a polymer of formaldehyde, called a "polyoxymethylene," which has excellent toughness and thermal stability. Heretofore very little has been known about the copolymerization of formaldehyde with other comonomers to produce a product having the polyoxymethylene structure as described in the above-mentioned MacDonald patent and as modified by the presence of comonomer units in the polymer chain. The present invention provides as a novel composition of matter a copolymer of formaldehyde and a vinyl ether.

It is an object of this invention to provide a copolymer of formaldehyde and a vinyl ether as a novel composition of matter. It is another object of this invention to provide a copolymer of formaldehyde and an aliphatic vinyl ether in which the aliphatic group contains 1–8 carbon atoms. It is still another object of this invention to provide a copolymer of formaldehyde and a cycloaliphatic vinyl ether in which the cycloaliphatic group contains 4–6 carbon atoms. Still another object of this invention is to provide a copolymeric composition which has the thermal stability and the strength properties of polyoxymethylene and at the same time has an increased toughness by reason of its greater flexibility. Still another object of this invention is to provide soluble copolymers from formaldehyde and vinyl ethers which are useful as coatings and as components of finishes. It is still another object of this invention to provide a process for preparing the aforementioned copolymers. Other objects will become apparent to those skilled in the art as the details of this invention are more fully described hereinafter.

The above objects are accomplished in accordance with this invention by contacting formaldehyde and a vinyl ether comonomer in the presence of a Friedel-Crafts metal halide catalyst and an inert liquid solvent at a temperature from about −80° C. to 100° C. for a time sufficient to permit solid particles of a copolymer of formaldehyde and vinyl ether to be formed. In the preferred method of operation tin tetrabromide is dissolved in a liquid hydrocarbon containing 3–10 carbon atoms, the tin tetrabromide being present in the amount of 0.001 to 5.0 millimoles per liter of hydrocarbon reaction medium. Into this reaction medium maintained at a temperature of about 0°–75° C. there is introduced a mixture of formaldehyde and a vinyl ether in a mol ratio of about 0.01 to 0.25 vinyl ether/formaldehyde. After a short reaction period of not more than about 30 minutes, sufficient copolymeric solids have formed to produce a dispersion having 2–10% by weight of solids. This dispersion is then filtered, washed, and dried to produce a normally solid copolymer of formaldehyde and the vinyl ether, insoluble in the liquid hydrocarbon reaction medium, or any other known solvent at room temperature, and containing from about 0.2 to 10 units of vinyl ether per 100 units of formaldehyde. If, on the other hand, the mol ratio of up to 0.5 vinyl ether/formaldehyde is employed, there is obtained also a copolymer which is soluble at room temperature in ordinary organic solvents and contains up to about 50 units of vinyl ether per 100 units of formaldehyde.

The vinyl ether comonomer in the context of this invention may be represented by the formula:

$$CH_2=CH-O-Y$$

wherein Y is a monovalent radical selected from the group consisting of alkyls of 1–8 carbon atoms, alkenyls of 1–8 carbon atoms, cycloalkyls of 4–6 carbon atoms, cycloalkenyls of 4–6 carbon atoms, and the radicals

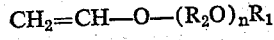

$$-(R_2O)_nR_1 \text{ and } -R_2\overset{O}{\overset{\|}{C}}OR_1$$

wherein $n$ is any positive integer from 1–7, $R_1$ is an alkyl radical of 1–7 carbon atoms, and $R_2$ is a saturated, bivalent, acyclic hydrocarbon radical of 1–7 carbon atoms, with the proviso that the total number of carbon atoms in $R_1$ and $R_2$ is not greater than 8. The preferred comonomers are the vinyl alkyl ethers when it is desirable that the copolymer be incapable of being crosslinked. On the other hand, when it is desirable that the copolymer be capable of being cross-linked, the preferred comonomer is a vinyl alkenyl ether. The specific compounds which are operable as comonomers in the process of this invention include, but are not limited to, vinyl methyl ether, vinyl ethyl ether, vinyl propyl ether, vinyl butyl ether, vinyl pentyl ether, vinyl hexyl ether, vinyl heptyl ether, vinyl octyl ether, vinyl isobutyl ether, vinyl 2-ethylhexyl ether, divinyl ether, vinyl propenyl ether, vinyl allyl ether, the vinyl butenyl ethers, the vinyl pentenyl ethers, the vinyl hexenyl ethers, the vinyl heptenyl ethers, the vinyl octenyl ethers, vinyl propadienyl ether, vinyl cyclobutyl ether, vinyl cyclopentyl ether, vinyl cyclohexyl ether, vinyl methylcyclohexyl ether, vinyl dimethylcyclohexyl ether, the vinyl cyclobutenyl ethers, the vinyl cyclopentenyl ethers, the vinyl cyclohexenyl ethers, the vinyl methylcyclohexenyl ethers, and the vinyl dimethylcyclohexenyl ethers. Some of the foregoing ethers are designated by classes, e.g. the vinyl butenyl ethers, and this designation is meant to include the various position isomers of that class. For example, the term "the vinyl butenyl ethers" includes vinyl 1-butenyl ether, vinyl 2-butenyl ether, and vinyl 3-butenyl ether. It will be obvious to those skilled in the art that some of the foregoing compounds may contain side-chain branching, substituent groups, or other alternatives such as heterocyclic compounds, e.g. as a furfuryl radical.

Among the vinyl ethers having the formula $$CH_2=CH-O-(R_2O)_nR_1$$

may be mentioned methoxymethyl vinyl ether; ethoxymethyl vinyl ether; propoxymethyl vinyl ether; butoxymethyl vinyl ether; pentoxymethyl vinyl ether, hexoxymethyl vinyl ether; heptoxymethyl vinyl ether; ethylene glycol methyl vinyl ether; propylene glycol methyl vinyl ether; butylene glycol methyl vinyl ether; pentenylene glycol methyl vinyl ether; hexylene glycol methyl vinyl ether; heptylene glycol methyl vinyl ether; dioxymethylene glycol methyl vinyl ether; tetraoxymethylene glycol ethyl vinyl ether; diethylene glycol ethyl vinyl ether; triethylene glycol ethyl vinyl ether; propylene glycol butyl vinyl ether; dipropylene glycol methyl vinyl ether; butylene glycol methyl vinyl ether; butylene glycol butyl vinyl ether; pentylene glycol propyl vinyl ether; and hexylene glycol ethyl vinyl ether.

Among the vinyl ether esters having the formula

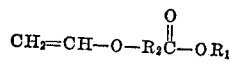

may be mentioned carbomethoxymethyl vinyl ether (which is the vinyl ether of methylhydroxyacetate); carbomethoxyethyl vinyl ether (which is the vinyl ether of methylhydroxypropionate); carbomethoxypropyl vinyl ether; carbomethoxybutyl vinyl ether; carbomethoxypentyl vinyl ether; carbomethoxyhexyl vinyl ether; carbomethoxyheptyl vinyl ether; carboethoxymethyl vinyl ether (which is the vinyl ether of ethylhydroxyacetate); carboethoxybutyl vinyl ether; carboethoxyhexyl vinyl ether; carbopropoxymethyl vinyl ether (which is the vinyl ether of propylhydroxyacetate); carbopropoxypentyl vinyl ether; carbobutoxymethyl vinyl ether; carbobutoxybutyl vinyl ether; carbopentoxypropyl vinyl ether; carbohexoxyethyl vinyl ether; and carboheptoxymethyl vinyl ether.

It is to be understood that, in all of the foregoing lists of the specific vinyl ethers suitable as comonomers in the process and product of this invention, there are some compounds which have not been mentioned and there are isomers of compounds which have not been mentioned. It is intended, however, that all compounds having the above-described formula, including the position isomers of those compounds, be considered as comonomers in this invention.

This invention may be more fully understood by reference to the following illustrative examples. Parts and percentages are by weight unless otherwise specified. Inherent viscosities are measured in either of two solvents—dimethylformamide or phenol. In the case of dimethylformamide, the inherent viscosity is measured at 150° C. on a solution of 0.5 gram of polymer in 100 ml. of dimethylformamide containing one gram of diphenylamine. In the case of phenol, the inherent viscosity is measured at 90° C. on a solution of 0.5 gram of polymer in 100 ml. of phenol. The relationship between inherent viscosity as measured in these two systems is approximately such that the inherent viscosity in dimethylformamide is equivalent to about 0.60 times the inherent viscosity in phenol. The formula for inherent viscosity is that reported by L. H. Cragg in "Journal of Colloid Science," volume 1, pages 261-9 (May 1946) and is expressed as follows:

$$\text{Inherent viscosity} = \frac{\ln \text{relative viscosity}}{C}$$

where relative viscosity equals ratio of solution viscosity to solvent viscosity and C equals concentration of solute in solution (grams of polymer per 100 ml. of solution). The analysis for the number of vinyl ether units in the copolymer was accomplished by one or more of the following techniques:

(1) Carbon-hydrogen chemical analysis,
(2) Methoxyl chemical analysis (for the case of vinyl methyl ether), and
(3) Infrared analysis at wave-lengths of 12.7 microns for the analysis, and 2.54 microns for the reference, this analysis being calibrated against the techniques of (1) and (2).

*Example 1*

The polymerization reactor used in this example consisted of a 500 ml. 3-neck flask fitted with gas inlet and outlet lines, a paddle agitator, and a thermometer. Into the reactor was placed 250 ml. of dry, refined cyclohexane followed by .0023 mols per liter of cyclohexane of the complex of boron trifluoride/diethyl ether as the polymerization initiator. A mixture of vapors of formaldehyde and vinyl methyl ether (CH₂=CH—O—CH₃) was then passed into the flask. The monomeric reactants were present in a mol ratio of 0.23 mol of vinyl ether per mol of formaldehyde. The contents of the flask were agitated at a temperature of 28° C. for a period of ten minutes. The total amount of formaldehyde introduced into the reactor flask was 20.7 grams. After the reaction period of ten minutes the introduction of formaldehyde and vinyl methyl ether was stopped, and nitrogen was passed into the monomer inlet lines for an additional five minutes. The reaction medium containing a dispersion of polymeric solids was then quenched with 100 ml. of methanol containing 0.2% by weight of pyridine. This treatment neutralized and deactivated the initiator. The entire reaction medium was then filtered, and the solids were washed once with cyclohexane, twice with methanol, once with a methanol-water mixture, and finally three times with acetone. The filtrate contained some soluble copolymeric product amounting to about 32% of the formaldehyde fed into the reactor. The solid collected by filtration was then air-dried, followed by drying in a vacuum oven. The product was a white granular solid amounting to 35% by weight of the formaldehyde introduced into the reactor. Infrared analysis on a film of the product indicated that it was a copolymer of formaldehyde and vinyl methyl ether containing 11% by weight of the vinyl methyl ether. The melting point (hot block method) of the copolymeric product was 35° below that of a homopolymer of formaldehyde. The inherent viscosity of the product was 0.13 measured at 150° C. on a solution of 0.5 gram of polymer in 100 ml. of dimethylformamide containing 1 gram of diphenylamine. The number average molecular weight of the product was calculated to be 12,500. The product had a reaction rate constant for thermal degradation at 202° C. of substantially zero, approximately 94% of the product having this stability. X-ray analysis indicated the product to be about 66% crystalline. This compares with a crystallinity of about 89% for a homopolymer of formaldehyde made by substantially the same procedure.

Similar copolymers of formaldehyde and vinyl methyl ether were obtained using various other inert liquids, such as heptane and toluene as the reaction medium; various other Friedel-Crafts-type polymerization initiators, such as tin tetrachloride, aluminum tribromide, antimony pentachloride, tin tetrabromide, boron trifluoride; and employing temperatures from about −70° C. to +60° C.

*Example 2*

Formaldehyde was copolymerized with vinyl isobutyl ether in a continuous process. The polymerization reactor was a four-neck, 500 ml. flask having a liquid overflow line in the bottom of the flask to maintain a constant liquid level. The flask was equipped with a thermometer, a stirrer, an inlet line for formaldehyde monomer vapors, a liquid inlet line for the reaction medium, an inlet line for the introduction of liquid vinyl ether, when required, and an outlet for unreacted vapors. The overflow line was connected to a receiver for the product dispersion. The reaction medium, in this case cyclohexane, was pumped through a column of silica gel and then merged with the inlet stream of a cyclohexane solution of the polymerization initiator, tin tetrabromide, before being brought up to the reaction temperature of 40° C. and introduced into the reactor. The flow rates of the inlet and outlet streams were so adjusted as to produce a product dispersion of approximately 5% by weight of copolymer solids. The input ratios were 0.030 millimole of tin tetrabromide per liter of cyclohexane reaction medium; and 0.099 mol of vinyl isobutyl ether per mol of formaldehyde. A hold-up time of about 4.5 minutes proved to be adequate to produce the desired product. The product dispersion was quenched in methanol, filtered, and washed as described in Example 1. Based on the inlet formaldehyde, a 98% yield of product was obtained. This copolymer product had a number average molecular weight of about 37,000 and an inherent viscosity of 0.71 measured in dimethylformamide as described above.

The above copolymer product was acetylated by forming a slurry of 0.5% by weight of copolymer solids in a mixture of acetic anhydride and pyridine (9:1 by volume) and refluxing (137° C.) that slurry for 15 minutes in an atmosphere of nitrogen and at a gage pressure of 2 inches of mercury. The acetylated product was filtered, washed with acetone, and dried, producing a 93% weight recovery over this step. The acetylated copolymer product was found to contain 6.5% by weight of vinyl isobutyl ether, or 2 mols of vinyl isobutyl ether per 100 mols of formaldehyde. The copolymer was found to have a number average molecular weight of about 34,000 and an inherent viscosity of 1.34 measured in phenol as described above.

To the acetylated product was added as a thermal stabilizer 1.0% by weight of a synthetic polyamide terpolymer, and as an antioxidant, 0.3% by weight of 4,4'-butylidene bis(3-methyl-6-tertiary-butyl phenol). The resulting composition was found to have a reaction rate constant for thermal degradation at 259° C. in vacuum of 0.08% by weight per minute. The details of this test are the same as those described in United States Patent 2,768,994 issued to R. N. MacDonald on October 30, 1956, with the exception that the present test is conducted at 259° C. (diphenyl ether vapors as a heating medium) and is conducted in a vacuum. The above composition containing the thermal stabilizer and the antioxidant was extruded into strands and cut into molding powder, which, in turn, was injection molded into test bars. Similar test bars were made from a homopolymer of formaldehyde (polyoxymethylene) of the same molecular weight and containing the same additives as the copolymer. The results of physical tests upon the bars made from the homopolymer and from the copolymer, are as follows:

|  | Copolymer | Homopolymer |
|---|---|---|
| Tensile strength, p.s.i. | 7,600 | 10,200 |
| Ultimate elongation, percent | 44 | 48 |
| Flexural modulus, p.s.i. | 353,000 | 432,000 |
| Izod impact strength, ft.lb./in. | 2.7 | 1.7 |

*Example 3*

Substantially the same process as described in Example 2 was employed to copolymerize formaldehyde and vinyl 2-ethylhexyl ether with a feed ratio of 0.029 mol of this vinyl ether to 1 mol of formaldehyde. The acetylated copolymer product contained 6% by weight of the vinyl ether, or 1.2 mols of vinyl 2-ethylhexyl ether per 100 mols of formaldehyde. The acetylated product had a number average molecular weight of about 39,000 and an inherent viscosity of 1.21 measured in phenol as described above. The same additives were employed as those of Example 2 and the molded test bars exhibited substantially the same physical test results as reported in Example 1, with the exception that the Izod impact strength was 1.7 ft. lb./in.

*Example 4*

Substantially the same process as that described in Example 2 was employed to copolymerize formaldehyde and vinyl allyl ether at a feed ratio of 0.116 mol of vinyl allyl ether per 1 mole of formaldehyde. The acetylated copolymer product contained 6% by weight of vinyl allyl ether, or 2.2 mol of vinyl allyl ether per 100 mols of formaldehyde. The acetylated copolymer was treated with the thermal stabilizer and the antioxidant described in Example 2 and the resulting composition was compression molded into films which were subjected to various dosages of irradiation by means of a Van de Graff accelerator. Similar films of a comparable, acetylated homopolymer of formaldehyde were treated in the same way as controls for the experiment. The object of the experiment was to determine the extent of cross-linking caused by the irradiation. "One pass" in the accelerator was equivalent to 200 microamperes at 2 m.e.v. All of the samples, both the copolymer and the homopolymer, progressively degraded as they were subjected to increasing dosages of irradiation.

| Irradiation dosage | Copolymer | | Homopolymer | |
|---|---|---|---|---|
| | Soluble in Phenol? | Zero strength temperature (° C.) | Soluble in phenol? | Zero strength temperature (° C.) |
| None | Yes | 161 | Yes | 165 |
| 0.1 pass | Yes | 164 | Yes | |
| 0.5 pass | No | 170 | Yes | 164 |
| 2.0 pass | No | 225 | Yes | 158 |

*Example 5*

Substantially the same process as described in Example 2 was employed to copolymerize formaldehyde and divinyl ether using a feed ratio of 0.078 mol of divinyl ether per mol of formaldehyde and using an initiator concentration of 0.12 millimole of tin tetrabromide per liter of cyclohexane reaction medium. The product contained 2% by weight of divinyl ether or 0.9 mol of divinyl ether per 100 mols of formaldehyde.

*Example 6*

In a series of runs similar to those described in Example 1 vinyl ethyl ether was copolymerized with formaldehyde using heptane as the reaction medium and, as the polymerization initiator, such compounds as tin tetrachloride and boron trifluoride etherate. Results similar to those described in the preceding examples were obtained.

*Example 7*

Substantially the same process as that described in Example 1, employing heptane as a polymerization medium and the complex of boron trifluoride/diethyl ether as a polymerization initiator, was used to copolymerize vinyl methyl ether and formaldehyde in a mol ratio of 0.23 mol of vinyl methyl ether per mol of formaldehyde. The product dispersion was diluted with water to deactivate the initiator and was then filtered to separate the solid copolymer (about 10 grams) from the filtrate. The filtrate formed two layers, one of heptane and one of water. These layers were separated by decanting, and the heptane layer, after being extracted with a fresh portion of water and then separated from that water, was evaporated to recover dissolved copolymer. All of the water layers from these separations were joined into one portion and extracted with diethyl ether. After separation of the ether layer and the water layer, each was evaporated to recover soluble copolymer in those layers. From the heptane layer was accumulated 1.94 grams of an oil which was a copolymer containing 40.6 mols of vinyl methyl ether per 100 mols of formaldehyde. From the water layer was recovered 0.81 gram of an oil which was a copolymer containing about 19.1 mols of vinyl methyl ether per 100 mols of formaldehyde. From the ether layer was recovered 2.77 grams of an oil which was a copolymer containing about 30.4 mols of vinyl methyl ether per 100 mols of formaldehyde. The original solid copolymer product of about 10 grams, recovered by filtration from the polymerization medium, was subjected to several extractions with methanol and with acetone. The combined methanol and acetone was evaporated to recover 2.02 grams of a wax which was a copolymer containing about 24.2 mols of vinyl methyl ether per 100 mols of formaldehyde.

The foregoing examples illustrate specific embodiments of this invention, and it is not intended that the invention be limited to the processes and compositions described therein.

The copolymers of this invention contain from 0.2 to 50 units of vinyl ether per 100 units of formaldehyde and may be represented by the general formula:

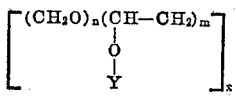

where Y is a monovalent radical as described above and n, m and x are positive integers having values such that the resultant product is a copolymer such that the relative amounts of vinyl ether and formaldehyde are those specified above. The preferred hydrocarbon-insoluble solid, thermoplastic, moldable copolymers contain 0.2 to 10 mols of vinyl ether per 100 mols of formaldehyde while the preferred organic solvent-soluble copolymers contain 10–50 mols of vinyl ether per 100 mols of formaldehyde. In general, the number average molecular weight of this copolymer must be at least about 10,000, and preferably above about 30,000, to cause the copolymer to be a normally solid thermoplastic material, and may be about 7,000 or higher to be a soluble wax, oil, or solid useful as a coating material or a component of finishes. The two comonomers should be substantially pure in order to produce the best copolymeric product. Vinyl ethers are available commercially and may be purified if desired by distillation in the presence of compounds such as potassium hydroxide or lithium aluminum hydride. The formaldehyde may be prepared in an anhydrous state by means of the process described in U.S. Patent 2,848,500, issued August 19, 1958, by D. L. Funck. Other methods of preparing anhydrous formaldehyde are described in the above-cited MacDonald patent U.S. 2,768,994, or by other procedures known to those skilled in the art.

The proportionate amounts of comonomers which are introduced into the reaction zone may vary over rather wide limits, although it has been found desirable when preparing the copolymers of this invention to employ about 0.01 to 0.25 mol of vinyl ether per mol of formaldehyde.

The reaction medium may be any inert liquid organic solvent for formaldehyde and the vinyl ether. The preferred materials for the reaction medium are the aliphatic, cycloaliphatic, and aromatic hydrocarbons containing 3–10 carbon atoms per molecule. Especially desirable solvents are cyclohexane, heptane, and toluene.

The polymerization catalyst employed in the process of this invention is any of the Friedel-Crafts metal halide catalysts, e.g. the halides of boron, aluminum, tin, antimony, and the like. The more desirable of these catalysts has been found to be tin tetrabromide, tin tetrachloride and boron trifluoride, since these materials are more active in the present process than are the other catalysts of this group. The amount of catalyst which is employed in this process may vary from about 0.001 to 5.0 millimoles per liter of reaction medium, although it is preferable to employ about 0.005 to 2.0 millimoles per liter. Generally, less amounts of tin tetrabromide or tin tetrachloride are required than boron trifluoride.

The reaction temperature and pressure are not critical since room temperature and atmospheric pressure are operable in this process as well as high temperatures or low temperatures at subatmospheric or superatmospheric pressures. Because of convenience, it is preferred to operate at atmospheric pressure and to employ temperatures of about 0°–75° C., although broader limits of temperature may be from about −80° C. to +100° C. The products of this invention are useful in the preparation of molded or extruded shaped articles such as fibers, filaments, films, sheets, rods, tubes, pipe, and other injection-molded or extrusion-molded articles. Some types of the copolymeric product are soluble in the common organic solvents at room temperature, and these portions are particularly useful as coating materials and as components of finishes. The common organic solvents which are capable of dissolving these copolymers at room temperature include, but are not limited to, hydrocarbons, halogenated hydrocarbons, alcohols, ketones, and ethers. The insoluble product; that is, insoluble at room temperature in any known solvent, has the general appearance and properties of the polyoxymethylene plastics, although as higher and higher amounts of vinyl alkyl ether is incorporated into the copolymer, lower and lower melting points are obtained and the composition becomes more and more flexible. The copolymers may be made more thermally stable by incorporating ester groups or ether groups at the end of any polymer chain which terminates with a formaldehyde unit and the copolymer may be modified by the addition of antioxidants, fillers, pigments, and the like.

We claim:

1. A copolymer of formaldehyde and a vinyl ether having the formula:

$$CH_2=CH-O-Y$$

wherein Y is a monovalent radical selected from the group consisting of alkyls of 1–8 carbon atoms, alkenyls of 1–8 carbon atoms, cycloalkyls of 4–6 carbon atoms, cycloalkenyls of 4–6 carbon atoms, and the radicals

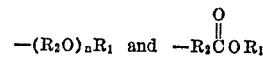

wherein n is any positive integer from 1–7, $R_1$ is an alkyl radical of 1–7 carbon atoms, and $R_2$ is a saturated, bivalent, acyclic hydrocarbon radical of 1–7 carbon atoms, with the proviso that the total number of carbon atoms in $R_1$ and $R_2$ is not greater than 8, the said copolymer having a number average molecular weight of at least 7,000 and containing from 0.2 to 50 mols of said vinyl ether in its polymeric rearranged form per 100 mols of oxymethylene units.

2. A normally solid, thermoplastic copolymer of formaldehyde and a vinyl ether having the formula:

$$CH_2=CH-O-Y$$

wherein Y is a monovalent radical selected from the group consisting of alkyls of 1–8 carbon atoms, alkenyls of 1–8 carbon atoms, cycloalkyls of 4–6 carbon atoms, cycloalkenyls of 4–6 carbon atoms, and the radicals

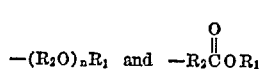

wherein n is any positive integer from 1–7, and $R_1$ is an alkyl radical of 1–7 carbon atoms, and $R_2$ is a saturated, bivalent, acyclic hydrocarbon radical of 1–7 carbon atoms, with the proviso that the total number of carbon atoms in $R_1$ and $R_2$ is not greater than 8, having a number average molecular weight of at least 10,000 and containing from 0.2 to 10 mols of said vinyl ether in its polymeric rearranged form per 100 mols of oxymethylene units.

3. A normally solid, thermoplastic, copolymer of formaldehyde and a vinyl alkyl ether in which the said alkyl contains from 1–8 carbon atoms, the said copolymer having a number average molecular weight of at least 10,000 and containing 0.2 to 10 mols of said vinyl alkyl ether in its polymeric rearranged form per 100 mols of oxymethylene units.

4. A normally solid thermoplastic copolymer of formaldehyde and a vinyl alkenyl ether in which said alkenyl contains from 1–8 carbon atoms, the said copolymer having a number average molecular weight of at least 10,000 and containing 0.2 to 10 mols of said vinyl alkenyl ether in its polymeric rearranged form per 100 mols of oxymethylene units.

5. A cross-linked copolymer of formaldehyde and vinyl allyl ether characterized by being insoluble in phenol and by having a zero strength temperature of at least 170° C.

6. A copolymer, soluble at room temperature in organic solvents, of formaldehyde and a vinyl ether having the formula:

$$CH_2=CH-O-Y$$

wherein Y is a monovalent radical selected from the group consisting of alkyls of 1-8 carbon atoms, alkenyls of 1-8 carbon atoms, cycloalkyls of 4-6 carbon atoms, cycloalkenyls of 4-6 carbon atoms, and the radicals $$-(R_2O)_nR_1 \text{ and } -R_2\overset{O}{\underset{\|}{C}}OR_1$$

wherein $n$ is any positive integer from 1-7, $R_1$ is an alkyl radical of 1-7 carbon atoms, and $R_2$ is a saturated, bivalent, acyclic hydrocarbon radical of 1-7 carbon atoms, with the proviso that the total number of carbon atoms in $R_1$ and $R_2$ is not greater than 8, said copolymer having a number average molecular weight of at least 10,000 and containing from about 10 to 50 mols of said vinyl ether in its polymeric rearranged form per 100 mols of oxymethylene units.

7. A coating comprising the product of claim 6.

8. A process for copolymerizing formaldehyde and a vinyl ether having the formula:

$$CH_2=CH-O-Y$$

wherein Y is a monovalent radical selected from the group consisting of alkyls of 1-8 carbon atoms, alkenyls of 1-8 carbon atoms, cycloalkyls of 4-6 carbon atoms, cycloalkenyls of 4-6 carbon atoms, and the radicals $$-(R_2O)_nR_1 \text{ and } -R_2\overset{O}{\underset{\|}{C}}OR_1$$

wherein $n$ is any positive integer from 1-7, $R_1$ is an alkyl radical of 1-7 carbon atoms, and $R_2$ is a saturated, bivalent, acyclic hydrocarbon radicals of 1-7 carbons, with the proviso that the total number of carbon atoms in $R_1$ and $R_2$ is not greater than 8, the process comprising contacting substantially anhydrous formaldehyde and said vinyl ether in an inert liquid hydrocarbon with a Friedel-Crafts metal halide catalyst at a temperature from about $-80°$ C. to $+80°$ C. for a time sufficient to permit solid particles of said copolymer to form with a number average molecular weight of at least 7,000, and thereafter recovering said copolymer containing 0.2 to 10 mols of said vinyl ether in its polymeric rearranged form per 100 mols of oxymethylene units.

9. The process of claim 8 in which the relative amounts of vinyl ether and formaldehyde which are contacted are 1 to 25 mols of said vinyl ether per 100 mols of formaldehyde.

10. The process of claim 8 in which said catalyst is tin tetrabromide.

11. A shaped article of the composition of claim 2.

References Cited in the file of this patent

UNITED STATES PATENTS

| | | |
|---|---|---|
| 2,312,743 | Arundale et al. | Mar. 2, 1943 |
| 2,543,312 | Copenhaver | Feb. 27, 1951 |
| 2,653,923 | Shekleton | Sept. 29, 1953 |
| 2,936,298 | Hudgin et al. | May 10, 1960 |

UNITED STATES PATENT OFFICE
CERTIFICATE OF CORRECTION

Patent 3,076,786                                  February 5, 1963

Northrop Brown et al.

It is hereby certified that error appears in the above numbered patent requiring correction and that the said Letters Patent should read as corrected below.

Column 8, line 53, before "having" insert -- the said copolymer --.

Signed and sealed this 17th day of September 1963.

(SEAL)
Attest:

ERNEST W. SWIDER                            DAVID L. LADD
Attesting Officer                                 Commissioner of Patents